(12) United States Patent
Boggenstall et al.

(10) Patent No.: US 7,758,290 B2
(45) Date of Patent: Jul. 20, 2010

(54) DEVICE FOR LOCKING OBJECTS INTO PLACE

(75) Inventors: Ludger Boggenstall, Kirchhatten (DE); Thomas Hienen, Bad-Zwischenahn (DE); Jochen Soller, Grasberg (DE)

(73) Assignee: Airbus Deutschland GmbH (DE)

( * ) Notice: Subject to any disclaimer, the term of this patent is extended or adjusted under 35 U.S.C. 154(b) by 540 days.

(21) Appl. No.: 11/660,064

(22) PCT Filed: Aug. 11, 2005

(86) PCT No.: PCT/EP2005/008745

§ 371 (c)(1),
(2), (4) Date: Feb. 12, 2007

(87) PCT Pub. No.: WO2006/018224

PCT Pub. Date: Feb. 23, 2006

(65) Prior Publication Data

US 2007/0253790 A1   Nov. 1, 2007

Related U.S. Application Data

(60) Provisional application No. 60/601,882, filed on Aug. 16, 2004.

(30) Foreign Application Priority Data

Aug. 16, 2004  (DE)  ........................ 10 2004 039 666

(51) Int. Cl.
*B64D 9/00* (2006.01)
*B60P 7/00* (2006.01)
*B60P 7/08* (2006.01)
*B60P 7/13* (2006.01)

(52) U.S. Cl. ........................ 410/80; 410/77; 244/118.1; 244/137.1

(58) Field of Classification Search ................. 410/80, 410/77, 79, 78, 81, 101; 244/118.1, 137.1
See application file for complete search history.

(56) References Cited

U.S. PATENT DOCUMENTS

| | | | | |
|---|---|---|---|---|
| 2,424,429 | A | * 7/1947 | Bamberg | ..................... 414/544 |
| 2,846,959 | A | 8/1958 | Perry | |
| 3,693,920 | A | 9/1972 | Trautman | |
| 3,724,814 | A | 4/1973 | Walton | |
| 3,906,870 | A | * 9/1975 | Alberti | ....................... 410/79 |
| 4,009,900 | A | 3/1977 | Didato et al. | |
| 4,121,789 | A | * 10/1978 | Lent et al. | ..................... 410/77 |
| 4,234,278 | A | 11/1980 | Harshman et al. | |
| 4,331,412 | A | 5/1982 | Graf et al. | |
| 4,349,302 | A | * 9/1982 | Ferguson, Jr. | ................. 410/69 |

(Continued)

FOREIGN PATENT DOCUMENTS

DE   18 11 042 U   5/1960

(Continued)

*Primary Examiner*—Patricia L Engle
(74) *Attorney, Agent, or Firm*—Lerner, David, Littenberg, Krumholz & Mentlik, LLP

(57) ABSTRACT

A device for locking containers into place includes a frame, at least one locking claw affixed to the frame, and an adjustment component which is affixed to the locking claw. A position of a container to be locked into place is adjustable relative to the locking claw in a longitudinal direction of the frame.

11 Claims, 3 Drawing Sheets

U.S. PATENT DOCUMENTS

Figure 1:
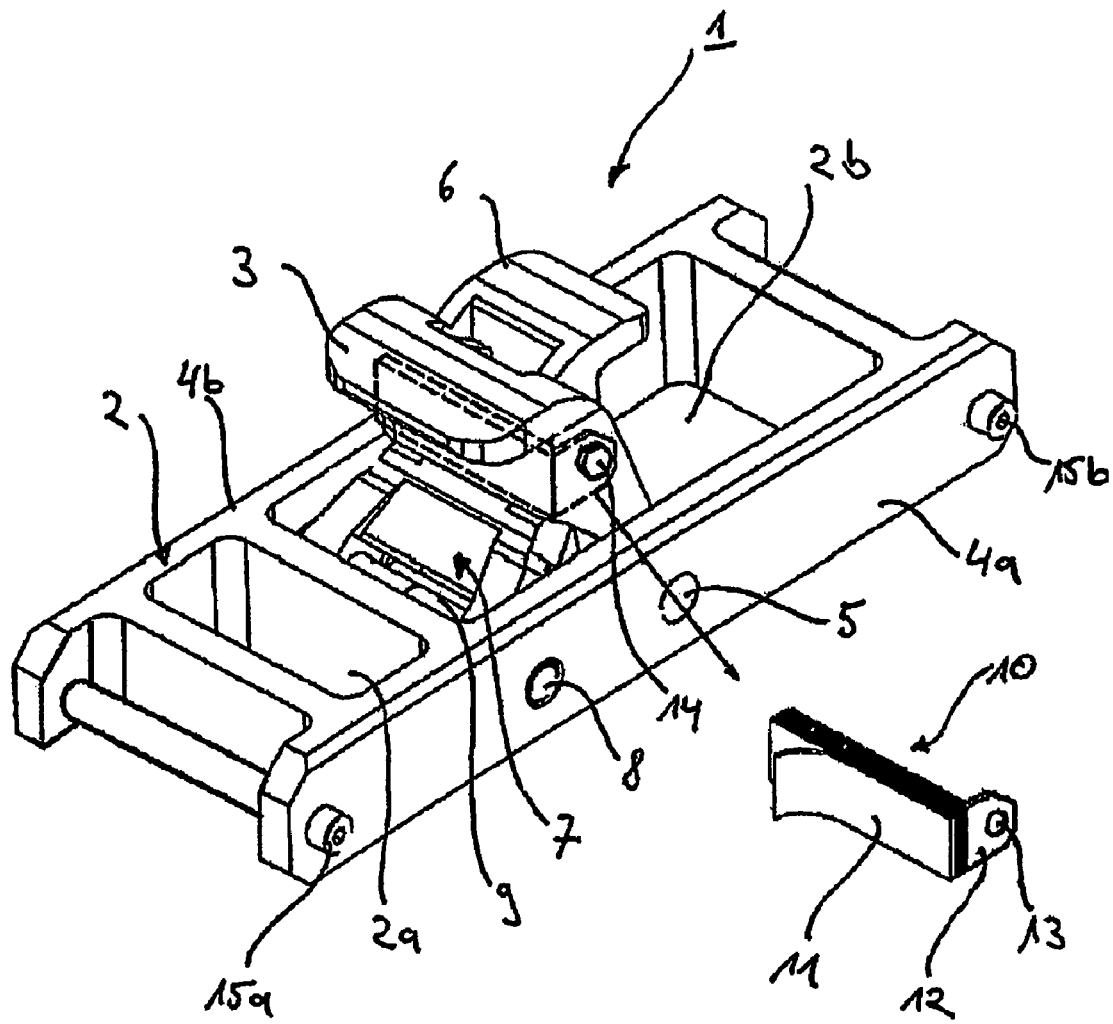

| | | | |
|---|---|---|---|
| 4,526,641 A * | 7/1985 | Schriever et al. | 156/247 |
| 5,265,991 A * | 11/1993 | Herrick et al. | 410/69 |
| 5,433,564 A * | 7/1995 | Sundseth | 410/77 |
| 6,193,453 B1 * | 2/2001 | Kernkamp | 410/79 |
| 6,413,029 B1 * | 7/2002 | Kernkamp | 410/79 |
| 6,425,717 B1 * | 7/2002 | Saggio et al. | 410/79 |
| 6,680,105 B2 * | 1/2004 | Caillas | 428/204 |
| 6,926,481 B2 | 8/2005 | Huber | |
| 2003/0049421 A1 | 3/2003 | Caillas | |
| 2004/0112260 A1 | 6/2004 | Grainger | |

FOREIGN PATENT DOCUMENTS

| | | |
|---|---|---|
| DE | 19 35 971 U | 3/1966 |
| DE | 2 161 735 | 7/1972 |
| DE | 102 05 871 A1 | 8/2003 |
| EP | 0 541 928 A | 5/1993 |
| SU | 429984 A2 | 5/1974 |
| SU | 1119885 A2 | 10/1984 |

* cited by examiner

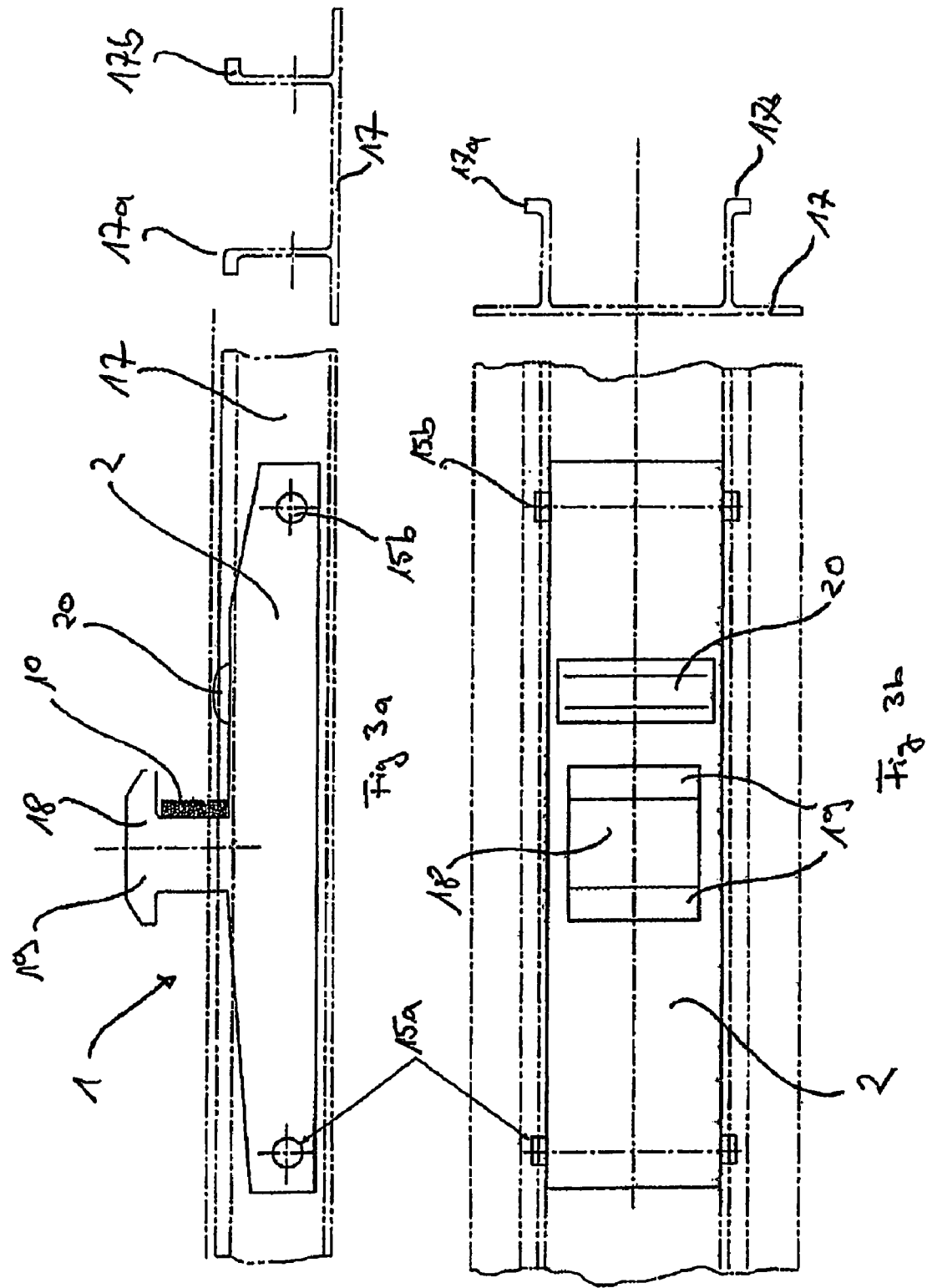

DEVICE FOR LOCKING OBJECTS INTO PLACE

This application claims the benefit of the filing date of U.S. Provisional Patent Application No. 60/601,882 filed on Aug. 16, 2004, the disclosure of which is hereby incorporated herein by reference and of the German Patent Application No. 10 2004 039 666.3 filed on Aug. 16, 2004, the disclosure of which is hereby incorporated herein by reference.

The present invention relates to a device for locking objects into place, in particular for locking containers, pallets and ACTs (auxiliary centre tanks) into place in a freight loading system which is for example located in an aircraft cargo compartment or hold.

Usually roller conveyors are used in aircraft cargo compartments, which roller conveyors are attached to a floor frame. The roller conveyor, on which for example an ACT (auxiliary centre tank) or other freight containers are conveyed into the aircraft cargo compartment, normally comprise conveyor rollers and locking components. Since normally several roller conveyors extend parallel underneath an ACT, said ACT has to be guided precisely in the roller conveyor and has to be attached by means of locking components. Said locking components have to be precisely aligned in the individual roller conveyors so that, for example, during a flight the load is distributed as evenly as possible on the locking components.

However, hitherto used locking components are not adjustable and they require expensive measuring work in the aircraft. As a rule, subsequent drilling of interface drill holes is required in order to meet the specified strict tolerances in the installed state. As a result of this the surface protection is damaged and subsequently has to be applied again. Subsequent correction is not possible.

It may be an object of the invention to provide a device with which it is possible, in a simple manner, to lock containers into place in a freight loading system precisely within close tolerances.

This object may be met by a device for locking an object, the device including a frame, a locking claw, and an adjustment component. The locking claw of the device is affixed to the frame. The adjustment component is affixed to the locking claw and allows adjustment of the position of the object in a substantially longitudinal direction of the frame. Other advantageous embodiments of the invention are stated herein.

The locking device according to an exemplary embodiment of the invention comprises a frame and a locking claw attached to the frame, wherein for precise and flexible adjustment of the locking device an adjustment module is fitted to the locking claw such that the position of an object which has to be locked is adjustable relative to the locking claw in longitudinal direction of the frame.

Preferably, the locking claw is pivotably arranged in the frame and can be pivoted to and fro between a retracted position and a raised (erected) position. It is only in the retracted position that the locking claw extends essentially within the frame, in longitudinal direction of said frame. In the raised position the locking claw extends so as to be essentially perpendicular to the longitudinal direction of the frame and protrudes from the frame. In the raised position of the locking claw, an object can be locked.

According to another exemplary embodiment of the invention the locking device comprises a holding device, which can safely hold the locking claw in the retracted position and/or in the raised position.

The holding device comprises, for example, a further locking claw, which is pivotably attached to the frame. This further locking claw is preferably arranged in such a way in relation to the one locking claw that the two locking claws support each other in the raised position. The holding device further comprises a spring element which spring-loads the two locking claws such that both are held in the retracted position, in other words essentially within the frame, extending in longitudinal direction.

If the device according to the invention comprises two locking claws, it is possible, in the raised position, for each of the two locking claws to lock an object into place.

According to another embodiment of the device according to the invention the locking claw is rigidly connected to the frame and extends so as to be essentially perpendicular away from the longitudinal direction of the frame. The end of the locking claw, which end faces away from the frame, is for example designed such that an object can be locked into place on one side and/or on another side of the locking claw.

According to the invention at least one of the locking claws has an adjustment module exchangeably fixed thereon. The adjustment module preferably extends essentially transversely across the locking claw in a region which engages with an object to be locked into place.

For example, the adjustment component is laterally screwed to a locking claw and extends transversely across the locking claw, in other words essentially across the longitudinal direction of the frame of the device. Preferably, the thickness of the adjustment component and thus the relative position of an object to be locked into place in longitudinal direction of the frame is adjustable. Adjusting the tolerance can, among other ways, take place by way of metal sheets of different thicknesses, which metal sheets are attached (for example screwed) to the locking claws. One possible variant may consists of a "package" of thin metal sheets (glued to each other) which metal sheets can then (after the device according to the invention has been installed in the aircraft) be peeled off one-by-one so that the required tolerance can be precisely set.

Furthermore, the device according to the invention comprises bolts which protrude laterally from the frame. By way of these bolts, the device according to the invention is fixed in a roller conveyor of a freight loading system.

According to the invention it is possible to expose the locking components and thus also the roller conveyors (and the floor frame situated below them) of a freight loading system to little load, because the containers, which are locked into place in the roller conveyors by way of locking components, can be adjusted precisely. Accordingly it is possible to use locking components of a less solid design, which in turn results in corresponding weight savings.

Furthermore, according to the invention it is possible to effect precise adjustment (locking into place) of a container even after installation of the locking components in a roller conveyor, in that a correspondingly designed (thick) adjustment component is attached to the locking claw of the locking device according to the invention.

Figure 2:
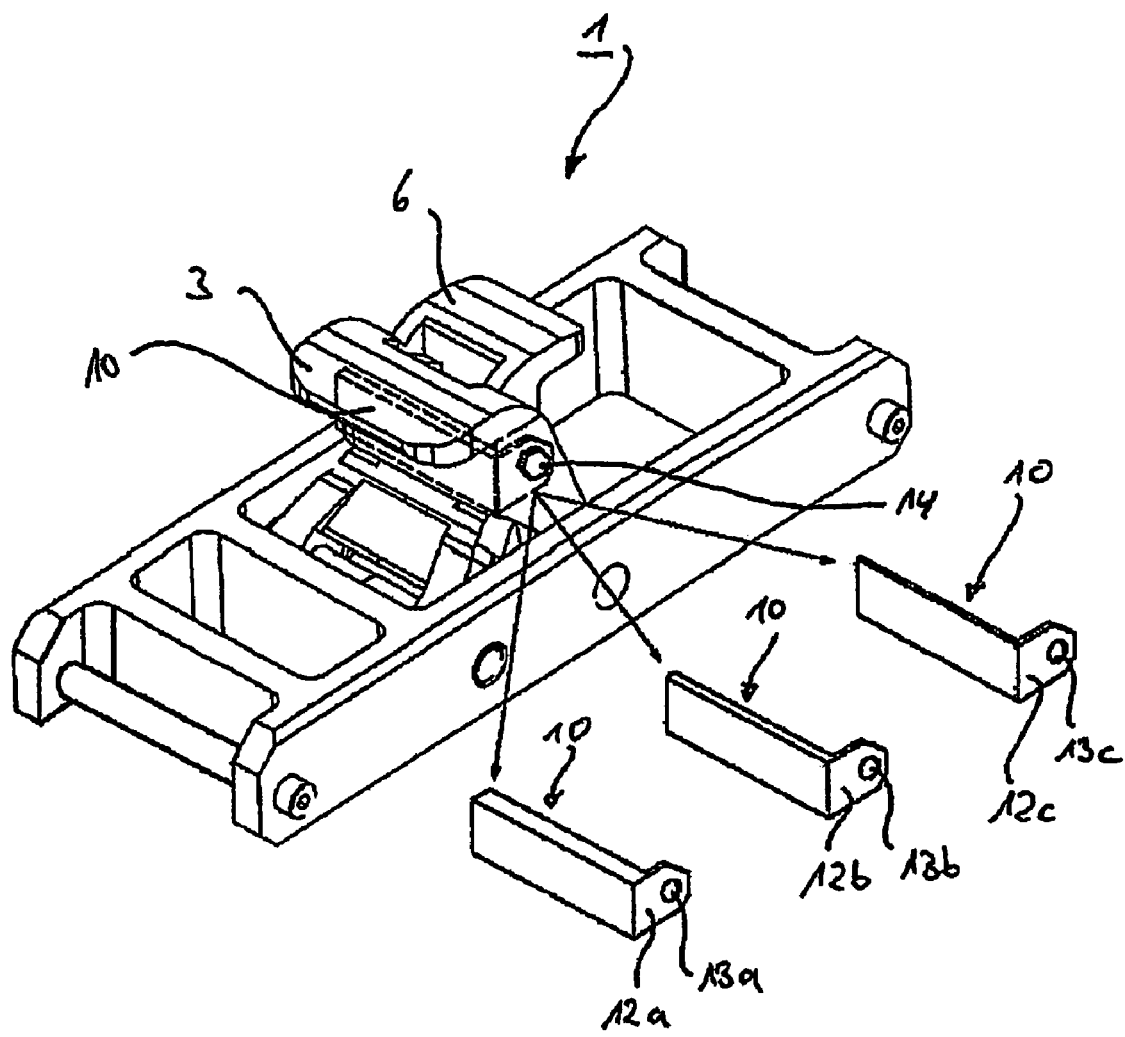

Below, preferred embodiments of the invention are described with reference to the enclosed drawings, wherein similar or corresponding components have the same reference signs. The following are shown:

FIG. 1 a perspective view of a locking device according to a first embodiment of the invention;

FIG. 2 a perspective view of a locking device according to a second embodiment of the invention;

FIG. 3a a cross-sectional view of a locking device according to a third embodiment of the invention; and FIG. 3b a top view of the locking device according to the third embodiment.

FIG. 1 shows a device for locking objects into place, for example for locking an ACT (auxiliary centre tank) into place, according to a first embodiment of the invention. The locking device 1 comprises a frame 2 which is for example a milled part. The locking device shown in FIG. 1 is a locking arrangement of the so-called XZ locking type.

As shown in FIG. 1, the frame 2 comprises a first frame region 2a and a second frame region 2b. In the second frame region 2b a first locking claw 3 is accommodated. The first locking claw 3 is pivotably (swivellably) attached to side walls 4a, 4b of the frame 2 and is pivotable on a swivel axis 5.

FIG. 1 further shows a second locking claw 6, which forms part of a holding device 7 and is arranged in such a way in relation to the first locking claw 3 that in the erect position the two locking claws 3, 6 support each other as shown in FIG. 1.

The second locking claw 6 is also attached to the side walls 4a, 4b of the frame 2 and is pivotable on a swivel axis 8.

FIG. 1 shows the device according to the invention in a state in which the first locking claw 3 and the second locking claw 6 are in a raised position. In order to move the device according to the invention into a retracted position the first locking claw 3 swivels on the swivel axis 5 in FIG. 1 to the left so that in an end position the free end of the first locking claw 3 is retracted in the first frame region 2a. Furthermore, the second locking claw 6 is swiveled on the swivel axis 8 such that the free end of the second locking claw 6 is retracted in the second frame region 2b. In the retracted position, the device according to the invention is for example held by means of a spring element 9, which forms part of the holding device 7. By manually activating a releasing device (not shown) the locking claws 3, 6 are moved from the retracted position to the raised position.

As shown in FIG. 1, an adjustment module (component) 10 is attached to the first locking claw 3. The adjustment component 10 can also be attached to the locking claw 6 or to both.

According to this embodiment the adjustment component 10 comprises a multitude of thin metal sheets 11, which are attached to each other in such a way that easy peeling off of individual metal sheets is possible. By correspondingly removing individual metal sheets, the thickness of the adjustment component 10 can be set.

On one end the adjustment component 10 comprises a region 12 which juts out essentially perpendicularly, in which region 12 a through-hole 13 is formed. By means of a screw 14 the adjustment component 10 can be attached to the first locking claw 3 via the through-hole 13, as is shown in FIG. 1. As an alternative, or in addition, an adjustment module of similar design can be attached in a similar way to the second locking claw 6.

Furthermore, it is also possible to attach the adjustment component 10 in some way other than by screwing it to the locking claw, for example by riveting or gluing. Preferably, however, the adjustment component 10 is attached in such a way that it is easily removable or exchangeable.

As shown in FIG. 1, the adjustment component 10 preferably extends transversely across the entire locking claw 3, in other words so as to be essentially perpendicular to the longitudinal direction of the frame 2 in a region which establishes contact with an ACT to be fixed by clamping.

As shown in FIG. 1, on each end of the frame 2 there are bolts 15a, 15b, which interconnect the two side walls 4a, 4b of the frame 2. By way of these bolts 15a, 15b the locking device according to the invention is attached to a roller rail of a freight loading system (not shown).

As shown in FIG. 1, in the raised position the first locking claw 3 can for example lock an ACT into place, while the second locking claw 6 also locks an ACT or another respective freight container into place.

The locking device 1 is installed in longitudinal direction in the roller rail (not shown).

FIG. 2 shows a locking device according to a second embodiment of the invention.

The locking device 1, shown in FIG. 2, differs from the locking device according to the first embodiment only in that the adjustment component 10 is of a different design. According to the embodiment shown in FIG. 2, sheet metal parts 16a, 16b, 16c of various thicknesses are used to adjust a freight container (or ACT) to be locked into place.

In a way similar to that in the first embodiment, the sheet metal parts 16a-16c each comprise a region 12a-12b which juts out so as to be essentially perpendicular, which regions 12a-12b comprise a through-hole 13a-13b. By means of a screw 14 the corresponding sheet metal parts are screwed to the first locking claw 3 either together or individually. The sheet metal parts 16a-16c, which serve to adjust a freight container to be jammed into place, can also be made from another suitable material, for example a plastic material.

Of course, according to the second embodiment, too, the adjustment component 10 (16a-16c) can in addition or as an alternative be attached to the locking claw 6.

FIG. 3a shows a locking device according to a third embodiment of the invention. This locking device is a fixed XZ locking bar. The locking device 1 shown in FIG. 3a comprises a frame 2 which is attached in a roller conveyor 17 between the side walls 17a, 17b of the roller conveyor. As shown in FIG. 3a, attachment is for example by way of fastening bolts 15a, 15b.

According to the locking device of the firm XZ locking bar type as shown in FIGS. 3a and 3b, a locking claw 18 essentially juts out perpendicularly from the frame 2.

As shown in FIG. 3a, the locking claw 18 protrudes from the roller conveyor 17. The free end 19 of the locking claw 18 is designed such that a freight container or an ACT can be locked into place.

As shown in FIG. 3a, an inner surface of the locking claw 18 comprises an adjustment component 10. In a way that is similar to the first and second embodiments, this adjustment component can be attached to the locking claw 18 so as to be exchangeable and can vary in thickness so as to make the required adjustment when locking a container or ACT into place.

In a way that is different to the first and second embodiments, according to the third embodiment the locking claw 18 is rigidly connected to the frame 2. If the locking device according to the first and second embodiments is incorporated in the roller conveyor 17 shown in FIG. 3a, the two locking claws 3, 6 according to the first and second embodiments can be lowered such that they are situated below the level of the rollers so that an ACT or freight container can be transported on it. This is not possible in the third embodiment of the invention.

FIGS. 3a and 3b also show a support 20 for an ACT or a container (pallet), so that Z-loads can also be absorbed by way of the locking frame.

Although preferred embodiments of the invention have been described above, it goes without saying that modifications and alterations can be made without leaving the scope of the invention as long as an adjustment component is attached to a locking bar such that by corresponding dimensioning of the adjustment component a container or ACT (or another object) to be locked into place can be adjusted.

Above, the invention has been described with reference to an aircraft freight space or hold. The invention is also applicable to freight loading systems in ships, railway, etc. or in other vehicles or buildings where precise adjustment of the locking components is required.

LIST OF REFERENCE SIGNS

1 Locking device
2 Frame
2a First frame region
2b Second frame region
3 First locking claw
4a, 4b Side walls of the frame
5 Swivel axis
6 Second locking claw
7 Holding device
8 Swivel axis
9 Spring element
10 Adjustment component
11 Adjustment sheets
12 Region of the adjustment component
13 Through-hole
14 Screw
15a, 15b Fastening bolt
16a, 16b, 16c Sheet metal parts
17 Roller conveyor
17a, 17b Side walls of the roller conveyor
18 Locking claw
19 Free end of the locking claw
20 Support for ACT, container, pallet, etc.

The invention claimed is:

1. A device for locking an object, comprising:
a frame;
a locking claw affixed to the frame; and
an adjustment component including a body and a tab, the adjustment component being exchangeably fixed to the locking claw in such a way that a position of the object is adjustable relative to the locking claw in the longitudinal direction of the frame, the body extending substantially transversely across the locking claw such that it is engageable with the object, and the tab extending substantially perpendicularly from the body.

2. The device of claim 1, wherein the locking claw is pivotably arranged in the frame so that in a retracted position it extends substantially within the frame in the longitudinal direction of said frame, while in a raised position it protrudes from the frame so as to be substantially perpendicular to the longitudinal direction of the frame.

3. The device of claim 2, wherein a holding device holds the locking claw in the retracted position or in the raised position.

4. The device of claim 3, wherein the holding device comprises a further locking claw, pivotably attached to the frame, which further locking claw is arranged in relation to the other locking claw so that in the raised position they support each other, and comprises a spring element which spring-loads the two locking claws such that both are held in the retracted position.

5. The device of claim 4, wherein the locking claws in the raised position each lock an object into place.

6. The device of claim 1, wherein the locking claw is fixedly connected to the frame and protrudes from the frame so as to be substantially perpendicular to the longitudinal direction of the frame in order to lock an object into place.

7. The device of claim 6, wherein the locking claw, at an end facing away from the frame, is designed such that from both sides objects can be locked into place.

8. The device of claim 1, wherein a thickness of the adjustment component and thus the relative position of the object to be locked into place can be adjusted in the longitudinal direction of the frame.

9. The device of claim 1, further comprising attachment bolts that protrude laterally from the frame for fixing the device in a roller conveyor.

10. The device of claim 1, wherein the tab extends substantially along the longitudinal direction of the frame.

11. The device of claim 1, wherein the tab includes a through-hole.

* * * * *